United States Patent
Kuo et al.

(10) Patent No.: US 8,821,630 B2
(45) Date of Patent: Sep. 2, 2014

(54) CARBOXYLATED-CARBOXYLIC POLYGLYCEROL COMPOSITIONS FOR USE IN CEMENTITIOUS COMPOSITIONS

(75) Inventors: Lawrence L. Kuo, Acton, MA (US); Izabela Goc-Maciejewska, Skórzewo (PL); Romain Faivre, Poznan (PL)

(73) Assignee: W. R. Grace & Co.-Conn., Columbia, MD (US)

( * ) Notice: Subject to any disclaimer, the term of this patent is extended or adjusted under 35 U.S.C. 154(b) by 512 days.

(21) Appl. No.: 13/102,165

(22) Filed: May 6, 2011

(65) Prior Publication Data

US 2012/0279426 A1    Nov. 8, 2012

(51) Int. Cl.
| | |
|---|---|
| C04B 28/02 | (2006.01) |
| C08G 63/668 | (2006.01) |
| C04B 24/28 | (2006.01) |
| C04B 103/30 | (2006.01) |
| C08L 67/02 | (2006.01) |

(52) U.S. Cl.
CPC ......... C08G 63/668 (2013.01); C04B 2103/302 (2013.01); C04B 24/283 (2013.01); C04B 28/02 (2013.01); C08L 67/025 (2013.01)
USPC ........... 106/696; 106/724; 106/725; 106/727; 106/728; 524/5; 524/73; 524/101; 524/160; 524/186; 524/317

(58) Field of Classification Search
CPC   C04B 28/02; C04B 24/283; C04B 2103/302; C04B 2103/304; C04B 2103/50
USPC ................. 106/696, 724, 728, 823, 725, 727; 524/5, 73, 101, 160, 186, 317
See application file for complete search history.

(56) References Cited

U.S. PATENT DOCUMENTS

| | | | |
|---|---|---|---|
| 2,110,695 A | 3/1938 | Batchelder |
| 2,182,397 A | 12/1939 | Eckey |
| 2,258,892 A | 10/1941 | Harris |
| 3,548,010 A | 12/1970 | Yoshino et al. |

(Continued)

FOREIGN PATENT DOCUMENTS

| | | |
|---|---|---|
| EP | 1801096 | 4/2007 |
| EP | 1920762 | 5/2008 |

(Continued)

OTHER PUBLICATIONS

JP 2002274909 Yamada et al. (Sep. 25, 2002) abstract only. p. 34 of STIC Search Report.*

(Continued)

*Primary Examiner* — Paul Marcantoni
(74) *Attorney, Agent, or Firm* — Craig K. Leon

(57) ABSTRACT

The invention relates to compositions and methods for modifying cementitious materials such as by reducing setting time. Polymer compositions of the invention are derived by polyetherifying mono-glycerols, optionally with alkylene glycols, to obtain polyglycerol homopolymers or copolymers, and then carboxylating the obtained polyglycerol homopolymers and/or copolymers with an organic acid having at least two carboxylic functionalities. The set retardation effect of the carboxylated-carboxylic polyglycerol polymer compositions in cementitious materials is reduced is compared to polyglycerol polymer not having the carboxylated-carboxylic groups, while its water reducing ability is maintained without loss of early compressive strength. Cementitious compositions and methods involving the carboxylated-carboxylic polyglycerol are also covered by the invention.

16 Claims, 1 Drawing Sheet

(56) References Cited

U.S. PATENT DOCUMENTS

| | | | |
|---|---|---|---|
| 3,637,774 A | | 1/1972 | Babayan |
| 3,968,169 A | | 7/1976 | Seiden et al. |
| 4,204,877 A | | 5/1980 | Moorer et al. |
| 4,456,627 A | | 6/1984 | Van Heteren et al. |
| 4,551,561 A | | 11/1985 | Stuhler |
| 4,950,441 A | | 8/1990 | Beseda et al. |
| 4,978,392 A | * | 12/1990 | Kilbarger et al. ............. 106/661 |
| 5,020,598 A | | 6/1991 | Cowan et al. |
| 5,058,679 A | | 10/1991 | Hale et al. |
| 5,349,094 A | | 9/1994 | Harris et al. |
| 5,510,542 A | | 4/1996 | Jakobson et al. |
| 5,597,934 A | | 1/1997 | Klein et al. |
| 5,634,972 A | * | 6/1997 | Pacanovsky et al. ......... 106/696 |
| 5,635,588 A | | 6/1997 | Eshuis et al. |
| 5,721,305 A | | 2/1998 | Eshuis et al. |
| 5,782,972 A | * | 7/1998 | Abelleira et al. ............. 106/696 |
| 5,880,182 A | * | 3/1999 | Minomiya et al. ................. 524/5 |
| 6,649,690 B2 | | 11/2003 | Kraft |
| 7,709,464 B2 | | 5/2010 | Eibl |
| 7,846,251 B2 | * | 12/2010 | Aldykiewicz et al. ........ 106/696 |
| 7,855,260 B2 | * | 12/2010 | Bichler et al. ................. 526/287 |
| 8,088,218 B2 | * | 1/2012 | Blackburn et al. ............ 106/772 |
| 2004/0107876 A1 | | 6/2004 | Tomita et al. |
| 2005/0031580 A1 | | 2/2005 | Allef et al. |
| 2006/0204472 A1 | | 9/2006 | Paleos et al. |
| 2006/0272554 A1 | | 12/2006 | Jardine et al. |
| 2007/0256605 A1 | * | 11/2007 | Aldykiewicz et al. ........ 106/823 |
| 2007/0284104 A1 | | 12/2007 | Beckman |
| 2008/0306211 A1 | | 12/2008 | Lemke et al. |
| 2009/0239958 A1 | | 9/2009 | Sakanishi et al. |

FOREIGN PATENT DOCUMENTS

| | | |
|---|---|---|
| EP | 2123304 | 11/2009 |
| JP | 61-238749 | 10/1986 |
| JP | 09-188754 | 7/1997 |

OTHER PUBLICATIONS

JP 2008297185 A (Dec. 11, 2008) Nishimura et al. abstract only. p. 24 of STIC Search Report.*
CN 101913793 A (Dec. 15, 2010) Zheng et al. abstract only. p. 69 of Search Report.*
CN 101775107 A (Jul. 14, 2010) Guo et al., abstract only.*
CN 101774780 A (Jul. 14, 2010) Zhu et al. abstract only. p. 74 of STIC Search Report.*
CN 101475338 (Jul. 8, 2009) Bai et al. abstract only. p. 91 of STIC Search Report.*
CN 101407386 A (Apr. 15, 2009) Li et al. abstract only. p. 95 of STIC Search Report.*
CN 101209911 (Jul. 2, 2008) Duan et al., abstract only. p. 100 of STIC Search Report.*
JP 01261254 A (Oct. 18, 1989) Ando et al., abstract only. p. 243 of STIC Search Report.*
EP 650941 (May 3, 1995) Minomiya et al., abstract only. p. 236 of STIC Search Report.*
DE 19534931 Al (Mar. 21, 1996) Gay et al., abstract only. p. 233 of STIC Search Report.*
JP 59073465 A (Apr. 25, 1984) Denki Kagaku, abstract only. p. 251 of STIC Search Report.*
JP 59146961 A (Aug. 23, 1984) A (Kajima Corp) abstract only. Answer 9 of 11, p. 15 of STIC Search Report.*
JP 59102851 A (Jun. 14, 1984) (Daiichi Kogyo) abstract only. Answer 10 of 11, p. 17 of STIC Search Report.*
Young, Form PCT/ISA/210, International Search Report for International Application No. PCT/US2012/033989, dated Jul. 17, 2012, 2 pages.
Young, Form PCT/ISA/237, Written Opinion of the International Searching Authority for International Application No. PCT/US2012/033989, dated Jul. 17, 2012, 6 pages.

* cited by examiner

CARBOXYLATED-CARBOXYLIC POLYGLYCEROL COMPOSITIONS FOR USE IN CEMENTITIOUS COMPOSITIONS

FIELD OF THE INVENTION

The present invention relates to additive and admixture compositions for hydratable cementitious compositions such as cement and concrete, and more particularly to the use of a carboxylated-carboxylic polyglycerol polymer composition which confers water reducing abilities without the significant set retardation characteristics typical of polyglycerols.

BACKGROUND OF THE INVENTION

In U.S. Pat. No. 4,204,877, Moorer et al. disclosed that crude glycerin bottoms, which are chemically comprised of polyglycerol, can be used as cement grinding additives and set retarders in the manufacture of hydraulic cement. Moorer et al. further disclosed that the polyglycerols are preferably selected from di-, tri-, and tetraglycerols and mixtures thereof. They further mentioned that the use of polyglycerols helped to avoid "a significant loss of consistency shortly after mixing" and to provide longer "board life" (setting time). However, the present inventors believe that these set retarding effects are not always desirable; and, further, that the increased setting time conferred by polyglycerols may come with an undesired decrease in compressive strength.

An objective of the present inventors is, therefore, to control (reduce) the set retardation and to counter-act other effects of polyglycerols in cementitious materials.

SUMMARY OF THE INVENTION

The present invention provides carboxylated-carboxylic polyglyerol polymer compositions which are useful as cement additives or concrete admixture compositions for modifying one or more properties of hydratable cementitious compositions such as cement and concrete.

Such additive or admixture compositions of the present invention function to reduce the water demand of the hydratable cementitious compositions, while also controlling set retardation, and also achieve workability at lower water/cement ratios.

The carboxylated-carboxylic polyglyerol polymer compositions of the invention also increase early compressive strength of cementitious compositions, through reduction of set time, and permit set retardation to be controlled by controlling the degree to which the polyglycerols are subjected to carboxylation.

The present inventors discovered that carboxylation of hydroxyl groups in polyglycerols is an effective method for reducing set retardation of the cementitious composition, and that set retardation can be controlled by adjusting the degree of carboxylation. In the present invention, a two-step synthetic procedure is applied whereby the first stage involves glycerol condensation and the second stage involves substitution, through esterification, of hydroxyl groups with carboxyl groups. The use of maleic anhydride is preferred for the carboxylation stage; but the use of other agents is possible, such as dicarboxylic acids, carboxylic acid anhydrides, and carboxylate esters.

A composition of the present invention for modifying hydratable cementitious materials, comprises: an aqueous solution of a carboxylated-carboxylic polygycerol polymer formed by (a) providing mono-glycerols having hydroxide groups capable of forming ether linkages;
(b) forming ether linkages from and between some of said mono-glycerol hydroxide groups, optionally with $C_2$-$C_3$ polyalkylene glycols, to obtain polyglycerol homopolymers or copolymers;
(c) carboxylating said obtained polyglycerol homopolymers or copolymers with at least one or both of the following polycarboxylic acid compounds represented by the following structures

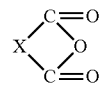

or $R^1O(O)C\text{—}Y\text{—}C(O)OR^2$ wherein
X and Y each independently represent $C_1$-$C_{10}$ saturated or unsaturated aliphatic or aromatic groups, said groups optionally containing a nitrogen atom or one or more carboxylic or sulfonic groups; and
$R^1$ and $R^2$ each independently represent hydrogen or $C_1$-$C_3$ alkyl groups.

The water-reducing carboxylated-carboxylic polyglycerol polymer composition may be used for modifying one or more properties of hydratable cementitious compositions, such as by introducing the composition as an additive before or during the manufacture of cement ("cement additive"), or by introducing the water-reducing composition as an admixture into hydratable cementitious compositions, such as concrete or mortar, to form a hardened structure.

The present invention also provides methods and cementitious compositions comprising or involving the use of the above-described carboxylated-carboxylic polygycerol additive or admixture compositions, optionally with one or more additives or admixtures which are conventionally used for modifying cement or concrete.

Further benefits and features of the invention will be discussed in further greater hereinafter.

BRIEF DESCRIPTION OF DRAWINGS

Further advantages and features of the present invention may be more readily comprehended when the following detailed description of exemplary embodiments is taken in conjunction with the appended drawings wherein.

DETAILED DESCRIPTION OF EXEMPLARY EMBODIMENTS

Figure 1:
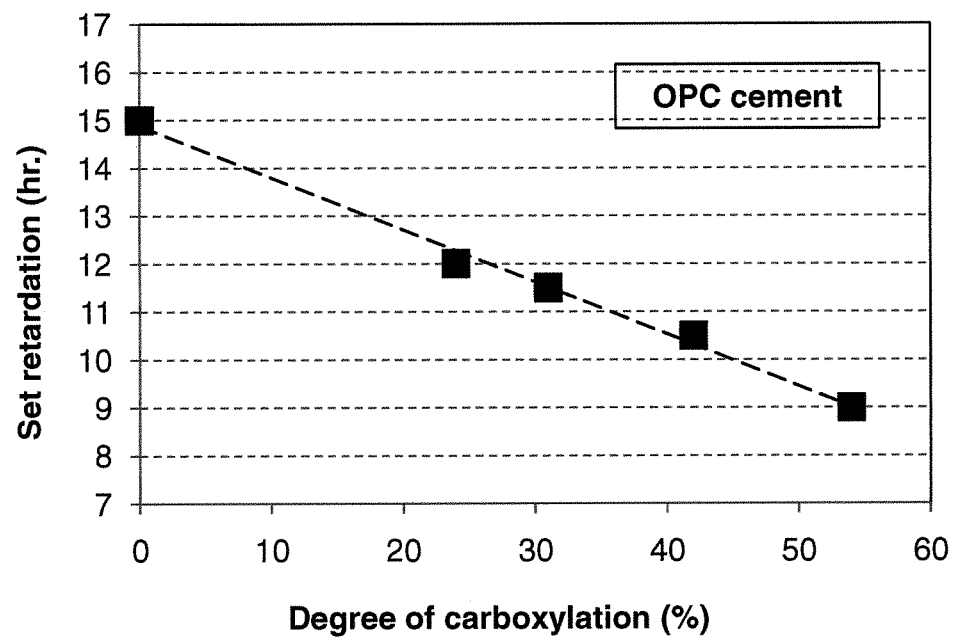
FIG. 1 is a graphic illustration of the performance, in ordinary Portland cement, of carboxylated-carboxylic polyglycerol polymer compositions of the invention having various percentage of carboxylation in terms of set retardation (hours)

The term "polyglycerol" as used herein means and refers to compounds obtained from polyetherification of pure glycerol, crude or bio-diesel glycerol, or mixtures of glycerol and polyalkylene glycol.

The term "polyalkylene glycol," also referred to as "polyalkylene oxide," can include polyethylene glycol, ethylene glycol-propylene glycol copolymers, or mixtures thereof. Preferably, the molecular weight of polyalkylene glycols used in the invention is less than 3,000, and more preferably less than 1,500.

As mentioned in the Background section, condensation of glycerol compounds is well-known. Although the present invention employs known condensation processes, including catalysis by alkaline or acid compounds, the processes are optimized to obtain higher molecular weight materials. Conventional alkaline catalysts can be used favorably in the present invention to condense the glycerol compounds. These may include alkaline metal hydroxides, such as sodium hydroxide, potassium hydroxide, and the like. Alkaline salts, such as sodium carbonate, are also believed to be effective in such condensation reactions. The amount of the alkaline catalyst should preferably be in the range of 0.05 weight percent to 5.0 weight percent based on the amount of glycerol. The results from the condensation experiment suggest that the reaction may proceed faster, at the same reaction temperature, with sodium carbonate than with sodium hydroxide.

The reaction temperature is preferably in the range 175-290° C., more preferably, 230-280° C., and, most preferably, 250-270° C. While higher temperatures increase the rate of reaction, temperatures which are excessively high may result in undesireble degradation of the reaction product. On the other hand, low temperatures may require excessively long reaction times.

The alkaline catalyzed reaction is carried out under inert gas to prevent undesireble oxidation of the product. An inert gas, such as nitrogen, argon, carbon dioxide, can be conveniently used for this purpose. The reaction time varies depending on the alkaline catalysis employed. When sodium hydroxide is used, the time required for the reaction to occur is somewhere in the range of 6-20 hours; while sodium carbonate catalyst generally enable the reaction time to be much shorter (e.g., 3-10 hours).

Glycerol condensation can utilize known homogenous acid catalysts, such as hydrochloric acid or nitric acid, or heterogeneous acid catalysts, such as anionic solid state catalysts. The reaction temperature of the acid catalyst process tends be shorter than alkaline catalysts (e.g., 170-200° C.) and shorter reaction times (e.g., 2-7 hours).

In general, alkaline-catalyzed reactions require higher temperatures and longer reaction times than do acid-catalyzed reactions. However, alkaline-catalyzed processes are less affected by impurities than are acid-catalyzed processes. The present inventors prefer using alkaline-catalyzed processes for glycerol having a low degree of purity.

So-called crude and technical grade glycerin can be favorably used to make polyglycerol products of the present invention using alkaline catalysis. Crude glycerol containing impurities as high as 50% can be used without an interference on the condensation reaction. So-called glycerin bottom or glycerin pitch (Compare Hazimah et al., *Journal of Oil Palm Research*, Vol. 15, No. 1, June 2003, page 1-5) can be also used as a polyglycerol starting material. The glycerol bottom is a by-product from glycerol production from crude glycerin.

The term "carboxylation" as used herein refers to incorporation of carboxylic groups onto polyglycerol through, for example, reaction of hydroxyl (—OH) groups with carboxyl groups which can be in the form of free acid, acid anhydride, carboxylate ester, or mixtures thereof. While it is known to add partial esters to polyglycerols through carboxylation, such as disclosed for example in U.S. Pat. No. 6,242,499 of Gruning et al., the present invention differs from such prior art carboxylation in at least three aspects: first, the prior art carboxylation requires high quantities of fatty acid; second, fatty acid esters tend to be water-insoluble and cannot be used in hydratable cementitious materials such as cement, mortar, and concrete for water-reducing purposes; and, third, such fatty acid esterified polyglycerols tend to act as emulsifiers.

On the other hand, the present inventors employ the term "carboxylated-carboxylic" in the present invention to refer to the carboxylation of polyglycerols using polycarboxylic acids, such as a dicarboxylic acid or tricarboxylic acid, wherein one or more carboxylic acid groups are incorporated onto polyglycerol molecules through carboxylation.

Polycarboxylic compounds contemplated for use in the present invention should contain at least two carboxylic groups and can be in the form of free acid, acid anhydride, carboxylic acid ester, or carboxylate ester. For example, the carboxylic anhydride can be chosen from a group including succinic anhydride, glutaric anhydride, maleic anhydride, itaconic anhydride, crotonic anhydride, phthalic anhydride, trimellitic anhydride, or mixtures thereof. The polycarboxylic acid can be chosen, for example, from a group including oxalic acid, malonic acid, succinic acid, glutaric acid, adipic acid, pimelic acid, suberic acid, azelaic acid, sebacic acid, maleic acid, fumaric acid, glutaconic acid, muconic acid, itaconic anhydride, crotonic anhydride, phthalic acid, isophthalic acid, terephthalic acid, citric acid, isocitric acid, aconitic acid, carballytic acid, trimesic acid, trimellitic acid, nitrilotriacetic acid, ethylenediamine tetra-acetic acid, and mixtures thereof. The polycarboxylate ester can be, for example, monoester, diester or triester of the above polycarboxylic acids, and the ester can comprise an alkyl group containing one to three carbons.

Thus, a composition of the invention for modifying hydratable cementitious compositions such as cement or concrete, comprises: an aqueous solution of a carboxylated-carboxylic polyglycerol polymer formed by (a) providing mono-glycerols having hydroxide groups capable of forming ether linkages; (b) forming ether linkages from and between some of said mono-glycerol hydroxide groups, optionally with $C_2$-$C_3$ polyalkylene glycols, to obtain polyglycerol homopolymers or copolymers; and (c) carboxylating said obtained polyglycerol homopolymers or copolymers with at least one or both of the following polycarboxylic acid compounds represented by the following structures

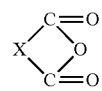

or $R^1O(O)C—Y—C(O)OR^2$ wherein X and Y each independently represent $C_1$-$C_{10}$ saturated or unsaturated aliphatic or aromatic groups, said groups optionally containing a nitrogen atom or one or more carboxylic or sulfonic groups; and $R^1$ and $R^2$ each independently represent hydrogen or $C_1$-$C_3$ alkyl groups.

In step (b), the formation of ether linkages may be carried out preferably at 200° C.-300° C., more preferably at 240° C.-280° C., and optionally (though preferably) in the presence of a catalyst. The catalyst may be selected, for example, from sodium carbonate, sodium hydroxide, or mixtures thereof.

As another example, the formation of ether linkages in step (b) may be carried out at 70° C.-150° C. for 1-10 hours, or, as another example, at 80° C.-120° C. for 4-8 hours.

In the formation of ether linkages in step (b), the optional addition of optional $C_2$-$C_3$ polyalkylene glycols will lead to formation of polyglycerol copolymers. For example, the optionally polyalkylene glycol may be selected from polyethylene glycol, ethylene glycol-propylene glycol copolymer, or mixture thereof. The polyalkylene glycol preferably has a molecular weight of less than 3,000, and more preferably less than 1,500.

In step (c), the polycarboxylic acid may be aliphatic or aromatic, and should contain at least two carboxylic groups in the form of a free acid, anhydride, or carboxylate ester. The polycarboxylic acid may be acid anhydride; such that, for example, X may be a —$CH_2$—$CH_2$— group of succinic anhydride; or X may be a —$CH_2$—$CH_2$—$CH_2$— group of glutaric anhydride; or X may be a —CH=CH— group of maleic anhydride.

During carboxylation, the preferred conditions are as follows: reaction temperature is 70-150° C.; reaction time should be 1-10 hours; the reaction should be carried out using an inert atmosphere; and, optionally, esterification catalysts should be employed. More preferably, the carboxylation reaction is carried out at 80° C.-120° C. for 4 to 8 hours. The weight ratio of the organic acid to polyglycerol depends on the desired degree of carboxylation. For example, the weight ratio of polyglycerol to acid may be 10/90 to 90/10, preferably 25/75 to 75/25, and most preferably 40/60 to 60/40.

Carboxylated-carboxylic polyglycerol polymers of the invention preferably have a number average molecular weight of 500 to 50,000, more preferably 650 to 30,000, and most preferably 800 to 20,000. (See Example 1 for Gel Permeation Chromatography conditions suggested for determining molecular weight of the polymer).

The present invention also provides methods for modifying hydratable cementitious compositions (such as cement or concrete) by introducing to the cementitious composition the carboxylated-carboxylic polyglycerol polymer composition in the amount of 0.05% to 2.0%, more preferably 0.08% to 1.0%, and most preferably 0.12% to 0.6% by weight based on weight of cement.

The present invention also provides hydratable cementitious compositions containing the carboxylated-carboxylic polyglycerol compositions, which may optionally further comprise or involve the use of one or more conventional cement additives or concrete admixtures.

The terms "cement" and "cementitious composition" (which may be synonymous with "cement composition") may be used herein to refer to dry powders as well as to pastes, mortars, shotcrete, grouts such as oil well cementing grouts, and concrete compositions comprising a hydratable cement binder. The terms "paste", "mortar" and "concrete" are terms of art: pastes are mixtures composed of a hydratable cement binder (usually, but not exclusively, Portland cement, masonry cement, or mortar cement and may also include limestone, hydrated lime, fly ash, granulated blast furnace slag, pozzolans, silica fume, metakaolin, or other materials commonly included in such cements) and water; mortars are pastes additionally including fine aggregate (e.g., sand), and concrete are mortars additionally including coarse aggregate (e.g., crushed gravel, stone).

Cementitious compositions of the present invention may be formed by mixing required amounts of certain materials, e.g., a hydratable cement, water, and optionally a fine aggregate (e.g., sand), coarse aggregate (e.g., crushed stone or gravel), or optionally a mixture of both fine and coarse aggregates, as may be applicable to make the particular cementitious composition being formed, and further combined with the water-reducing carboxylated-carboxylic polyglycerol polymer additive or admixture compositions as described above, and may optionally further include one or more additives and/or admixtures as conventionally used for modifying cement, mortar, concrete, or other cementitious compositions.

Compositions and methods of the invention, in addition to including at least one carboxylated-carboxylic polyglycerol as described herein, may optionally comprise or involve the use of one or more conventional cement additives or concrete admixtures, such as one or more alkanolamines. The alkanolamine or alkanolamines may include, but not be limited to, diethanolamine (DEA), triethanolamine (TEA); diethanolisopropanolamine (DEIPA); triisopropanolamine (TIPA); tetrahydroxyethyl ethylene diamine (THEED); and other alkanolamines. The carboxylated-carboxylic polyglycerol may be used in a polyglycerol:alkanolamine additive ratio of 100:1 to 1:1 and more preferably 10:1 to 3:1. Thus, compositions and methods of the invention may comprise a hydratable cementitious binder and the carboxylated-carboxylic polyglycerol polymer and alkanolamine combination wherein the carboxylated-carboxylic polyglycerol is present in the amount of 0.005 to 0.5% by dry weight based on weight of the cementitious binder.

Compositions and methods of the invention, in addition to including at least one carboxylated-carboxylic polyglycerol polymer as described herein, may optionally comprise or involve the use of one or more oxyalkylene-group-containing compounds, such as a polyoxylakylene compound having repeating EO groups, PO groups, or a mixture thereof. Such oxyalkylene group-containing compounds, if further having cement-anchoring groups such as carboxylate moieties, can function as superplasticizers or water reducers, as described above. Such oxyalkylene-group-containing compounds may also function as air entraining agents or air detraining agents and/or shrinkage reduction agents.

Compositions and methods of the invention, as another example, in addition to the at least one carboxylated-carboxylic polyglycerol polymer as described herein, may further comprise or include the use of at least two oxyalkylene group-containing compositions, such as a first group which is operative to fluidify a cementitious composition, and a second group, which is operative to control air entrainment and/or reduce shrinkage or shrinkage cracking in hydratable cementitious compositions.

Further compositions and methods of the invention may further comprise or include the use of at least one other agent selected from the group consisting of a water-reducing agent, an alkanolamine, a defoamer, an air-entraining agent, or mixtures thereof. For example, the water-reducing agent can be selected from a gluconate, lignosulfonate, naphthalene sulfonate, melamine sulfonate, or polycarboxylate superplasticizer.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

EXAMPLE 1

Preparation of Carboxylated-Carboxylic Polyglycerol

A four-neck 500 mL round bottom flask was fitted with thermocouple connected to temperature controller and heating mantle, mechanical stirrer, nitrogen inlet, and Dean-Stark trap with condenser. Four hundred grams of glycerol were charged to the flask and then stirred under argon atmosphere. Eight grams of sodium carbonate powder were added to the flask under stirring. The flask was heated to 265° C., and the reaction was continued for 9 hours 265° C. Aqueous Gel Permeation Chromatography (GPC) measurement of the resulting polyglycerol polymer indicated a weight-average and number-average molecular weights of 980 and 690, respectively, using polyethylene glycol (PEG) as standard for calibration. GPC columns are commercially available from Waters Corporation, Massachusetts, USA, under the trade names ULTRAHYDROGEL™ 1000, ULTRAHYDROGEL™ 250 and ULTRAHYDROGEL™ 120. The GPC processing conditions are as follows: 1% aqueous potassium nitrate as elution solvent, flow rate of 0.6 mL/min, injection volume of 80 µL, column temperature at 35° C., and refractive index detection.

The polyglycerol was then reacted with various amounts of maleic anhydride for 6 hours at 80-85° C. After reaction, the product was dissolved in water to yield a 50% solution. All molecular weights were measured using the GPC method described above.

$^1$H NMR spectra of the final product indicated that about 98% to 100% of maleic anhydride was consumed, and the degree of esterification was calculated and summarized in Table 1 below.

TABLE 1

| Additive | Maleic anhydride (g) | Poly glycerol (g) | Degree of Substitution (%) | Weight-average Molecular Weight |
|---|---|---|---|---|
| A | 0 | 100 | 0 | 880 |
| B | 36 | 100 | 24 | 1,100 |
| C | 47 | 100 | 31 | 1,580 |
| D | 61 | 100 | 42 | 1,730 |
| E | 79 | 100 | 54 | 1,900 |

The results in Table 1 and the NMR spectra indicate that glycerol was condensed and that materials having controlled amounts of carboxylate functionality were obtained.

EXAMPLE 2

Testing of Carboxylated-Carboxylic Polyglycerol Using Ordinary Portland Cement

In this example, the properties of carboxylated-carboxylic polyglycerol additives were evaluated in a standard mortar test for measuring workability, set time, and 2-day compressive strength. Ordinary Portland cement CEM I (available in Europe) was used at a sand/cement/water ratio of 2.7/1/0.5. All tests were carried out in the presence of an air-detraining agent. The active dose of the additive was 0.14% by weight of cement (0.14% "bwoc") and the workability was calculated from slump and spread as follows:

Workability=slump+(spread 1+spread 2)/2−100

The set time was determined using an isothermal calorimeter (AdiaCal™ TC brand) at 20° C.) while compressive strength was measured according to European Standard EN 196-1. Various carboxylated-carboxylic polyglycerols of the invention were compared with a "Blank" (without an additive) and with the un-carboxylated-carboxylic polyglycerol (Additive A). The results are shown in Table 2 below. The set retardation was also plotted against the degree of carboxylation and shown in FIG. 1.

TABLE 2

Mortar Test Results Using Ordinary Portland Cement

| Additive | Additive Dose (% by weight of cement) | Slump (mm) | Ave. Spread (mm) | Workability (mm) | 2-day strength (MPa) | Set time (hr) |
|---|---|---|---|---|---|---|
| REFERENCE | | | | | | |
| None | 0.00 | 67 | 124 | 91 | — | — |
| A | 0.14 | 79 | 134 | 113 | 29 | 15.0 |
| PRESENT INVENTION | | | | | | |
| B | 0.14 | 79 | 133 | 112 | 33 | 12.0 |
| C | 0.14 | 81 | 134 | 115 | 33 | 11.5 |
| D | 0.14 | 73 | 127 | 100 | 32 | 10.5 |
| E | 0.14 | 84 | 137 | 121 | 34 | 9.0 |

As shown in Table 2, the carboxylated-carboxylic polyglycerol of the invention behaves as a water reducer and is effective in suppressing retardation or the mortar. In addition, the 2-day strength also increased as the degree of carboxylation increased and the set time decreased.

FIG. 1 shows an almost linear reversed-relationship between the degree of carboxylation and set time, suggesting that carboxylation is an effective way to control set retardation.

EXAMPLE 3

Testing of Carboxylated-Carboxylic Polyglycerol Using Fly Ash Blended Cement

Figure 2:
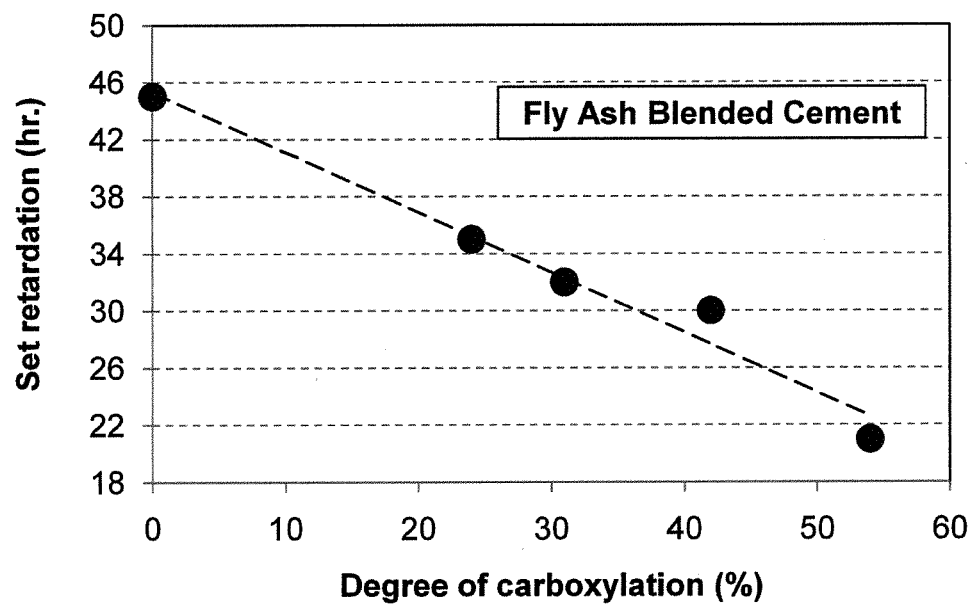
FIG. 2 is a graphic illustration of the performance, in a fly ash blended cement, of carboxylated-carboxylic polyglycerol polymers of the invention having various percentage of carboxylation in terms of set retardation (hours).

In this example, the testing protocol of Example 2 was employed, except that fly ash was blended with Portland cement (CEM IV, available in Brazil) and the active dose of the additive was 0.20% by weight of total cementitious materials. The results are tabulated in Table 3 and graphically illustrated in FIG. 2.

TABLE 3

Mortar Test Results Using Fly Ash Blended Cement

| Additive | Additive Dose (% by weight of cement) | Slump (mm) | Ave. Spread (mm) | Workability (mm) | 2-day strength (MPa) | Set time (hr) |
|---|---|---|---|---|---|---|
| REFERENCE | | | | | | |
| None | 0.00 | 83 | 130 | 113 | — | — |
| A | 0.20 | 109 | 189 | 198 | 1 | 45 |
| PRESENT INVENTION | | | | | | |
| B | 0.20 | 110 | 196 | 206 | 9 | 35 |
| C | 0.20 | 106 | 177 | 183 | 14 | 32 |
| D | 0.20 | 109 | 183 | 192 | 16 | 30 |
| E | 0.20 | 107 | 180 | 187 | 20 | 21 |

The results in Table 3 clearly indicate that the degree of set retardation and 2-day strength can be tailored by controlling the degree of carboxylation of polyglycerol. FIG. 2 again shows an almost linear reversed-relationship between the degree of carboxylation and set retardation even for fly ash blended cement.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

We claim:

1. A cementitious composition, comprising: a hydratable cementitious binder and a carboxylated-carboxylic polyglycerol polymer having a number average molecular weight of 800 to 20,000, the carboxylated-carboxylic polyglycerol polymer being formed by
   (a) providing mono-glycerols having hydroxide groups capable of forming ether linkages;
   (b) forming ether linkages from and between some of said mono-glycerol hydroxide groups, to obtain polyglycerol homopolymers;
   (c) carboxylating said obtained polyglycerol homopolymers with at least one or both of the following polycarboxylic acid compounds represented by the following structures

or $R^1O(O)C—Y—C(O)OR^2$
wherein
X and Y each independently represent $C_1$-$C_{10}$ saturated or unsaturated aliphatic or aromatic groups, said groups optionally containing a nitrogen atom or one or more carboxylic or sulfonic groups; and
$R^1$ and $R^2$ each independently represent hydrogen or $C_1$-$C_3$ alkyl groups.

2. The cementitious composition of claim 1 wherein, in said step (b), said forming of ether linkages is carried out at 200° C. -300° C.

3. The cementitious composition of claim 1 wherein, in said step (b), said forming of ether linkages is carried out in the presence of a catalyst.

4. The cementitious composition of claim 3 wherein, in said step (b), said forming of ether linkages is carried out in the presence of a catalyst selected from sodium carbonate, sodium hydroxide, or mixture thereof.

5. The cementitious composition of claim 1 wherein, in said step (c), said polycarboxylic acid compound is aliphatic or aromatic and contains at least two carboxylic groups in the form of a free acid, anhydride, or carboxylate ester.

6. The cementitious composition of claim 5 wherein, in said step (c), said polycarboxylic acid is an acid anhydride.

7. The cementitious composition of claim 6 wherein said X represents a group selected from —$CH_2$—$CH_2$— group of succinic anhydride, —$CH_2$—$CH_2$—$CH_2$— group of glutaric anhydride, and —CH=CH— group of maleic anhydride.

8. The cementitious composition of claim 1 wherein, in said step (c), said forming of ether linkages is carried out at 70° C. -150° C. for 1-10 hours.

9. The cementitious composition of claim 1 wherein the weight ratio of polyglycerol to acid is 10/90 to 90/10.

10. The cementitious composition of claim 1 wherein the weight ratio of polyglycerol to acid is 25/75 to 75/25.

11. A method for making the cementitious composition of claim 1 comprising introducing to said hydratable cementitious composition said carboxylated-carboxylic polyglycerol in the amount of 0.05% to 2.0% by weight of cement.

12. The method of claim 11 wherein the amount of said carboxylated-carboxylic polyglycerol is 0.08% to 1.0% by weight of cement.

13. The method of claim 12 wherein the amount of said carboxylated-carboxylic polyglycerol is 0.12% to 0.6% by weight of cement.

14. The cementitious composition of claim 1 further comprising at least one other agent selected from the group consisting of a water-reducing agent, an alkanolamine, a defoamer, an air-entraining agent, or mixtures thereof.

15. The cementitious composition of claim 14 wherein said at least one other agent is a water-reducing agent selected from a gluconate, lignosulfonate, naphthalene sulfonate, melamine sulfonate, or polycarboxylate superplasticizer.

16. A cementitious composition, comprising: a hydratable cementitious binder and a carboxylated-carboxylic polyglycerol polymer having a number average molecular weight of 800 to 20,000, the carboxylated-carboxylic polyglycerol polymer being formed by
   (a) providing mono-glycerols having hydroxide groups capable of forming ether linkages;
   (b) forming ether linkages from and between some of said mono-glycerol hydroxide groups to obtain polyglycerol homopolymers;
   (c) carboxylating said obtained polyglycerol homopolymers with at least one or both of the following polycarboxylic acid compounds represented by the following structures

or $R^1O(O)C—Y—C(O)OR^2$
wherein
X independently represents a —CH=CH— group of maleic anhydride and Y independently represents a $C_1$-$C_{10}$ saturated or unsaturated aliphatic or aromatic groups, and Y optionally contains a nitrogen atom or one or more carboxylic or sulfonic groups; and
$R^1$ and $R^2$ each independently represent hydrogen or $C_1$-$C_3$ alkyl groups.

* * * * *